(12) United States Patent
Kermene et al.

(10) Patent No.: US 8,908,262 B2
(45) Date of Patent: Dec. 9, 2014

(54) METHOD AND DEVICE FOR AMPLIFYING AN OPTICAL SIGNAL

(75) Inventors: Vincent Kermene, Aixe Sur Vienne (FR); Agnès Desfarges-Berthelemot, Couzeix (FR); Alain Barthelemy, Limoges (FR)

(73) Assignees: Universite de Limoges, Limoges (FR); Centre National de la Recherche Scientifique, Paris (FR)

( * ) Notice: Subject to any disclaimer, the term of this patent is extended or adjusted under 35 U.S.C. 154(b) by 6 days.

(21) Appl. No.: 13/819,818

(22) PCT Filed: Sep. 5, 2011

(86) PCT No.: PCT/FR2011/052027
§ 371 (c)(1),
(2), (4) Date: Apr. 8, 2013

(87) PCT Pub. No.: WO2012/042141
PCT Pub. Date: Apr. 5, 2012

(65) Prior Publication Data
US 2013/0188244 A1    Jul. 25, 2013

(30) Foreign Application Priority Data
Sep. 7, 2010 (FR) ..................................... 10 57107

(51) Int. Cl.
*H01S 3/23* (2006.01)
(52) U.S. Cl.
USPC .................... 359/337; 349/349; 349/337.4
(58) Field of Classification Search
USPC ....................... 359/337, 337.4, 349
See application file for complete search history.

(56) References Cited

U.S. PATENT DOCUMENTS

| 5,392,154 A | 2/1995 | Change |
| 5,832,006 A | 11/1998 | Rice |
| 6,256,141 B1 | 7/2001 | Kosaka |

(Continued)

FOREIGN PATENT DOCUMENTS

| EP | 0571126 A2 | 11/1993 |
| WO | 2008121273 A2 | 10/2008 |

OTHER PUBLICATIONS

International Search Report mailed Dec. 9, 2011, in connection with International Application No. PCT/FR2011/052027, filed Sep. 5, 2011.

*Primary Examiner* — Mark Hellner
(74) *Attorney, Agent, or Firm* — Duane Morris LLP; J. Rodman Steele, Jr.; Gregory M. Lefkowitz (57) ABSTRACT

According to the invention, the optical signal (SE) is spatially divided into N elementary optical signals (SE.1, SE.2, ..., SE.N), the spectral ranges thereof being adjacent in pairs and forming, substantially by juxtaposition, the spectral range of the optical signal; these N elementary signals are amplified respectively by means of N elementary amplifiers (4.1, 4.2, ..., 4.N), the spectral ranges thereof respectively comprising the spectral ranges of said N elementary signals; the N amplified elementary signals (Ss.1, Ss.2, ..., Ss.N) are assembled to form an amplified optical signal (Ss), the spectral range thereof substantially coinciding with a predetermined spectral range, and finally the spectral phases of the N initial elementary signals (Ss.1, Ss.2, ..., Ss.N) are adjusted before amplification on the basis of the spectral phase of said amplified signal (Ss).

13 Claims, 5 Drawing Sheets

(56) References Cited

U.S. PATENT DOCUMENTS

| | | | |
|---|---|---|---|
| 7,502,395 B2 * | 3/2009 | Cheng et al. | 372/32 |
| 7,884,997 B2 * | 2/2011 | Goodno | 359/349 |
| 8,184,363 B2 * | 5/2012 | Rothenberg | 359/349 |
| 8,514,485 B2 * | 8/2013 | Rothenberg | 359/341.1 |
| 2002/0131164 A1 * | 9/2002 | Palese | 359/349 |
| 2005/0128554 A1 | 6/2005 | Wickham | |
| 2005/0169630 A1 | 8/2005 | Takiguchi | |
| 2009/0201575 A1 | 8/2009 | Fermann | |

* cited by examiner

METHOD AND DEVICE FOR AMPLIFYING AN OPTICAL SIGNAL

CROSS-REFERENCE TO RELATED APPLICATIONS

This application is a §371 national stage entry of International Application No. PCT/FR2011/052027, filed Sep. 5, 2011, which claims priority to French Patent Application No. 1057107, filed Sep. 7, 2010, the entire contents of which are incorporated herein by reference.

The invention relates to a method and a device for amplifying an optical signal having a wide spectral range.

Although not exclusively, this method is particularly well suited to the amplification of optical signals formed of one or more ultrashort pulses (the duration of which is less than one hundred femtoseconds) and having a wide spectrum.

It is known that, in order to amplify ultrashort pulses, it is possible to use a CPA (Chirped Pulse Amplification) system, as described for example in U.S. Pat. No. 7,486,436. This system comprises a plurality of optical elements disposed in a linear and successive manner downstream of an ultrashort pulse generator. The pulses are firstly stretched (for example one hundred times) by a first, dispersive optical element, and then amplified (after optional pre-amplification) by a second, amplifying optical element or by a string of amplifiers, in the form for example of one or more amplifying optical fibres, and are then compressed by a third, dispersive optical element back to their initial duration.

Although this technique is advantageous for extracting energy from the pulses, it has the drawback of entailing large losses at the level of the pulses owing to the stretching and compression stages, which are moreover particularly cumbersome (prisms, diffraction gratings, etc., for example).

Furthermore, this technique has the drawback of being sensitive to the phenomenon of spectral narrowing by the gain of the amplifying medium (for example an amplifying optical fibre), which causes an increase in the duration of the pulses. Indeed, starting from an optical signal $S_E$, the power spectral density $DSP_E$ of which is continuous and non-zero over a range of wavelengths $\Delta\lambda_E$, and an amplifying medium, the gain G of which has a spectral density which coincides, at least in part, with $DSP_E$ and is continuous and non-zero over a spectral range $\Delta\lambda_G$, if $\Delta\lambda_E$ is greater than $\Delta\lambda_G$, the wavelengths included in $\Delta\lambda_E$, but not in $\Delta\lambda_G$, are not amplified, and those at the limit of $\Delta\lambda_G$ are amplified very little. It therefore follows that the optical signal output by the amplifier has a non-zero power spectral density over a reduced range compared to $\Delta\lambda_E$, and that consequently spectral information has been lost or distorted. This negative effect is particularly sensitive when the amplification takes place in an optical fibre which provides a high but non-uniform gain G over the entire spectral range $\Delta\lambda_G$.

A technique of this type is thus not suitable for amplifying ultrashort pulses having a wide spectral band.

In order to amplify ultrashort pulses without narrowing the spectrum thereof, a known solution consists in using an amplifying optical fibre, the non-linear optical properties of which are exploited in order both to amplify the pulses and widen the spectrum thereof beyond the initial spectrum. The pulses output by the fibre can then be compressed back to their initial duration while maintaining the benefits of the amplification within the fibre.

However, this known technique has the drawback of involving a large number of parameters (gain of the fibre, dispersion and non-linear effects within the fibre), and this makes the amplification system particularly sensitive to any deviation from the optimised parameters. The energies achieved using a system of this type also prove to be lower than the energies generally observed with the CPA system described above.

The present invention thus relates to a method and a device for amplifying an optical signal which are suitable in particular for amplifying ultrashort pulses having a wide spectral band, in terms of energy, robustness and preservation of the spectrum.

To this end, according to the invention, the method for amplifying an optical signal is notable in that:

the optical signal is spatially divided into N elementary optical signals, the spectral ranges of which are adjacent in pairs and form, substantially by juxtaposition, the spectral range of the optical signal, N being an integer at least equal to 2;

the N elementary optical signals are amplified respectively by means of N elementary amplifiers, the spectral ranges of amplification of which respectively comprise substantially the spectral ranges of said N elementary optical signals;

the N amplified elementary optical signals are assembled to form an amplified optical signal, the spectral range of which substantially coincides with a predetermined spectral range; and the spectral phases of the N initial elementary optical signals are adjusted before amplification on the basis of the spectral phase of said amplified optical signal.

Thus, owing to the invention, it is possible to amplify an optical signal having a wide spectral band without narrowing said band. Indeed, according to the invention, N different portions of the spectrum of the optical signal are amplified in parallel, each of the portions of the spectrum being carried by one of the N elementary optical signals. Insofar as each of these portions is narrow enough that its width is less than that of the amplification gain spectrum, it follows that each of these portions of the spectrum of the optical signal is amplified without the spectral width thereof being liable to be narrowed. Since the elementary amplified signals are then recombined to reconstruct a predetermined spectrum which may be the spectrum of the initial optical signal, the optical signal reconstructed in this manner is amplified without the spectrum thereof—and more particularly the spectral width thereof—being degraded.

It will be noted that this division of the optical signal is performed in two dimensions: a spatial dimension and a spectral dimension. Thus, starting from a for example uniform distribution of the signal into N elementary signals, the invention makes it possible, by the spatial division, to reduce the peak power of each elementary signal by a factor N compared to the original optical signal, and, by the spectral division, to extend the duration of each elementary signal by a factor N, which amounts to reducing the peak power thereof by a new factor N. The sampling of the signal in two dimensions thus makes it possible to reduce the peak power of the original signal by a factor $N^2$, which makes it possible to adapt each elementary signal even better to a high gain amplification despite limited elementary gain spectra.

It will be noted that a distribution of this type also makes it possible to inject a lesser energy, by a factor N, into the elementary amplifiers, which makes it possible to avoid any risk of destruction of the elementary amplifiers while extracting a high energy.

Also owing to the invention and in particular to the adjustment of the spectral phases of the N elementary optical signals, it is ensured that an amplified optical signal of a duration substantially equal to a predetermined duration, which may be that of the initial optical signal or of another signal, the form of which is sought with a view to a given application, is reconstructed from the N amplified elementary optical signals.

Also owing to the invention, the losses associated with stretching and compression steps are reduced, insofar as the optical signal no longer needs to be stretched or compressed a large number of times, as in the prior art CPA system described above.

Also owing to the invention, the appearance of non-linear phenomena, which tend to widen and distort the spectra, and thus extend very substantially the duration of the amplified pulses, which then can no longer return to their original duration after the final step of temporal compression, is limited.

Also owing to the invention, it is now possible to benefit maximally from the industrial advantages of optical fibre amplifiers, such as their compactness, their robustness or their electrical/optical efficiency.

In order to maintain the width of the spectrum of the initial optical signal, the predetermined spectral range may correspond substantially to the spectral range of the initial optical signal before amplification.

In a preferred embodiment, the N elementary optical signals are amplified by means of the N elementary amplifiers such that the power spectral density of the amplified optical signal has a profile substantially identical to a predetermined profile. Thus, insofar as the invention makes it possible to control independently a plurality of portions of the spectrum of the optical signal to be amplified, it is possible to construct, by recombining the different portions of the spectrum, not the original spectrum, but a spectrum of which the amplitude profile and the phase profile are substantially different, for example adapted to a particular application. To this end, different optical pumping levels can be applied or different doped amplifying media used, for example.

By extension, the control of the spectral phases makes it possible to structure the temporal profile of the amplified signal such that it is for example adapted to an application which requires a signal having a particular temporal profile. In a borderline case, the invention may also substantially increase the width of the amplified spectrum in comparison to the initial spectrum, so as to produce amplified pulses which are shorter than those input into the system, after the final step of recombining the N elementary signals.

The predetermined profile may substantially correspond to the profile of the power spectral density of the initial optical signal. For this, elementary amplification gains which are all identical may be selected. It is thus ensured that, after amplification, both the width and the form of the spectrum of the initial optical signal before amplification are preserved.

In another preferred embodiment, the spectral phases of the N elementary optical signals are adjusted, on the basis of the spectral phase of said amplified optical signal, such that the duration of the amplified optical signal is substantially equal to a predetermined duration. It is thus ensured that both the spectral range and the duration of the initial optical signal are preserved, which is particularly advantageous in the case of an optical signal in the form of ultrashort pulses having a wide spectral band. In addition, it thus becomes possible to construct a signal having a duration adapted to the envisaged application.

The predetermined duration, on the basis of which the spectral phases of the N elementary optical signals are adjusted, may correspond substantially to the duration of the initial optical signal. It is thus ensured that, after amplification, both the width and the duration of the spectrum of the initial optical signal before amplification are preserved.

The invention also relates to a device for amplifying an optical signal, which device is notable in that it comprises:
- means for spatially dividing the optical signal into N elementary optical signals, the spectral ranges of which are adjacent in pairs and form, substantially by juxtaposition, the spectral range of the optical signal, N being an integer at least equal to 2;
- elementary amplifiers arranged to amplify the N elementary optical signals, the spectral ranges of said elementary amplifiers respectively comprising substantially the spectral ranges of said N elementary optical signals;
- means for assembling the N amplified elementary optical signals to form an amplified optical signal, the spectral range of which substantially coincides with a predetermined spectral range; and
- means for adjusting the spectral phases of the N initial elementary optical signals before amplification on the basis of the spectral phase of said amplified optical signal.

According to a particular embodiment, the elementary amplifiers comprise an array of N cores of at least one amplifying optical fibre, having respectively N elementary amplification gains, the means for spatially dividing the optical signal being arranged to distribute the N elementary optical signals spatially into said N cores. It will be understood that these N cores may be disposed separately in N optical fibres or in a single optical fibre, or distributed in a number of optical fibres between 1 and N.

The adjustment means preferably comprise:
- a first modulation portion, disposed between the means for spatially dividing the optical signal and the means for assembling the N amplified elementary optical signals, capable of modulating at least in part the spectral phases of the N initial elementary optical signals; and
- a second control portion, disposed downstream of said means for assembling said N amplified elementary optical signals, connected to the first modulation portion and capable of receiving the amplified optical signal, of analysing the spectral phase of said amplified optical signal, of deducing therefrom the phase modulations to apply to said N elementary optical signals in order for the power spectral density of the amplified optical signal to have a profile substantially identical to a predetermined profile, and of providing corresponding orders to said first modulation portion.

The control portion of the adjustment means makes it possible to measure the combining efficiency of the amplified elementary signals, and to deduce therefrom, in real time, the ideal phase relationships which are necessary, before amplification, for perfect combining efficiency. These phase relationships are then applied in real time to the N elementary signals by the modulation portion.

The second control portion of the adjustment means may be arranged to receive the initial optical signal and compare it, during the analysis of the spectral phase of the amplified optical signal, with said amplified optical signal.

Furthermore, the means for assembling the N amplified elementary optical signals are arranged to cause said N amplified elementary optical signals to interfere temporally.

In order to ensure that the spectrum of the optical signal is not affected, the number N of elementary optical signals and the spectral ranges of said elementary optical signals are determined such that the spectral ranges of the N elementary amplifiers respectively comprise substantially the spectral ranges of said N elementary optical signals.

According to a particular embodiment, the number N of elementary optical signals and the spectral ranges of said elementary optical signals are also determined such that the energies of said N elementary optical signals are substantially equal.

In order to construct an amplified optical signal having a spectrum which has a desired profile, at least two of the N elementary amplifiers have different elementary amplification gains.

The figures of the appended drawings will aid understanding of how the invention may be implemented. In these figures, identical reference signs denote similar elements.

Figure 1:
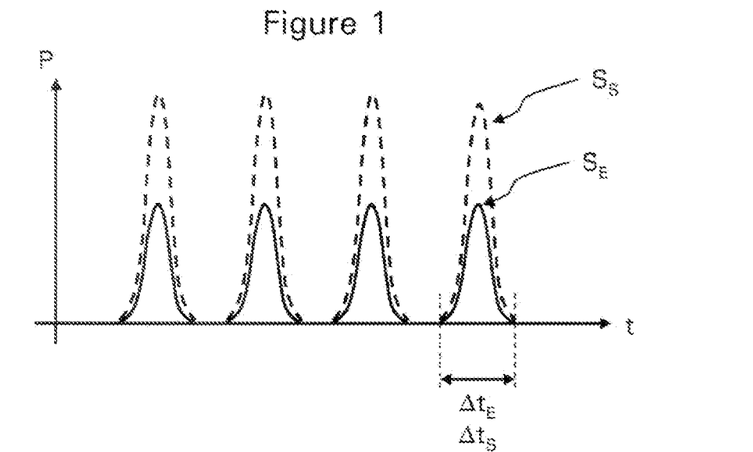
FIG. 1 is a diagram showing an example of temporal form of the initial optical signal to be amplified according to the invention.

FIG. 1 shows schematically an optical signal $S_E$, which is in the form of an ultrashort pulse (for example part of an ultrashort pulse train), the duration $\Delta t_E$ of which is less than one hundred femtoseconds. However, it is self-evident that the invention may also be applied to other forms of optical signal, for example continuous signals, and to pulses which are longer in duration. A signal $S_E$ of the type shown in FIG. 1 may be generated for example from a femtosecond laser oscillator.

Figure 2:
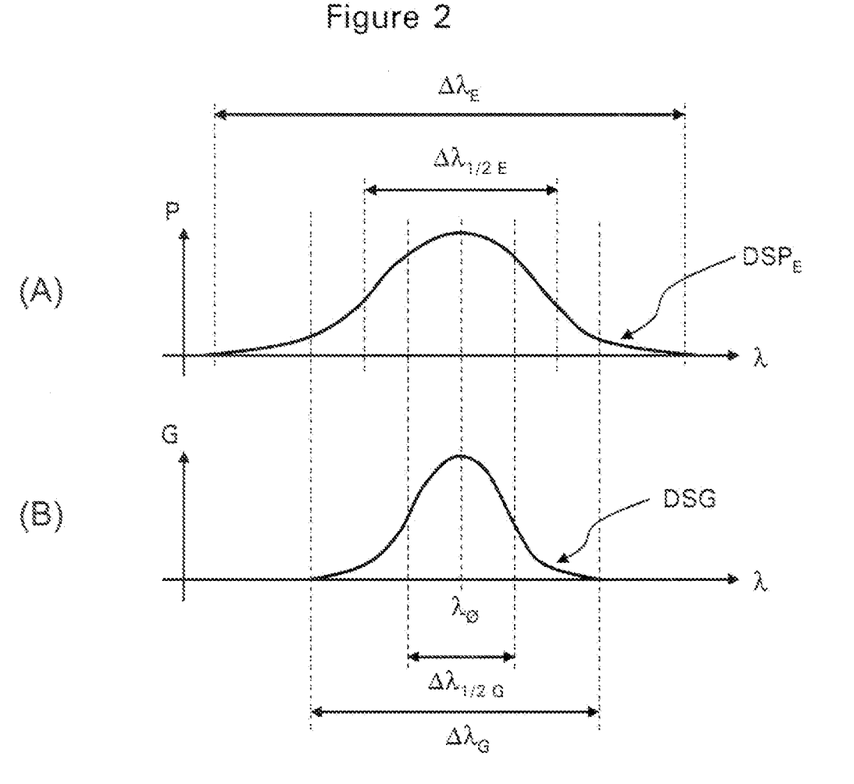
FIG. 2 comprises diagrams A and B showing respectively the power spectral density of the optical signal to be amplified and the amplification gain spectral density.

The spectrum, or power spectral density $DSP_E$, of this optical signal $S_E$ is shown in diagram A in FIG. 2. This spectrum shows that the power spectral density of the signal $S_E$ is continuous over a spectral range $\Delta\lambda_E$ and decreases at the periphery of this range, such that the spectrum $DSP_E$ is centred on a wavelength $\lambda\varnothing$.

In this context, spectral range $\Delta\lambda_E$ is understood to mean the interval over which the power spectral density $DSP_E$ of the signal $S_E$ is non-zero, this range—or interval—having a certain width.

The object of the invention is to amplify the optical signal $S_E$ so as to provide an amplified optical signal $S_S$ (FIG. 1), the duration $\Delta_S$ of which is substantially equal to a predetermined duration and the spectrum of which is identical, in terms of its form and its range, to a predetermined spectrum. In the following example, also shown in FIG. 1, the spectral width, the duration of the signal and the profile of the power spectral density—all predetermined—correspond substantially to those $\Delta\lambda_E$, $\Delta t_E$ and $DSP_E$ respectively of the initial optical signal $S_E$.

However, as shown in diagram B in FIG. 2, the gain spectral density DSG of the amplification gain G of an amplifier, the form of which is also decreasing at the periphery thereof and centred on $\lambda\varnothing$, may have a spectral range $\Delta\lambda_G$, the width of which is less than that $\Delta\lambda_E$ of the optical signal $S_E$ to be amplified. Therefore, when the optical signal $S_E$ is amplified by the gain G, the wavelengths which are located in the range $\Delta\lambda_E$, but not in the range $\Delta\lambda_G$, are not amplified, and the wavelengths which are located in the range $\Delta\lambda_E$, but not in the range $\Delta\lambda_{1/2}$ (spectral range at half-height of the gain spectral density), are amplified with a significant distortion.

It is thus important to preserve the spectral range $\Delta\lambda_E$ of the signal $S_E$ or at least the spectral range $\Delta\lambda_{1/2E}$ (spectral range at the half-height of the power spectral density of the signal $S_E$) which contains the wavelengths of highest energy.

Figure 3:
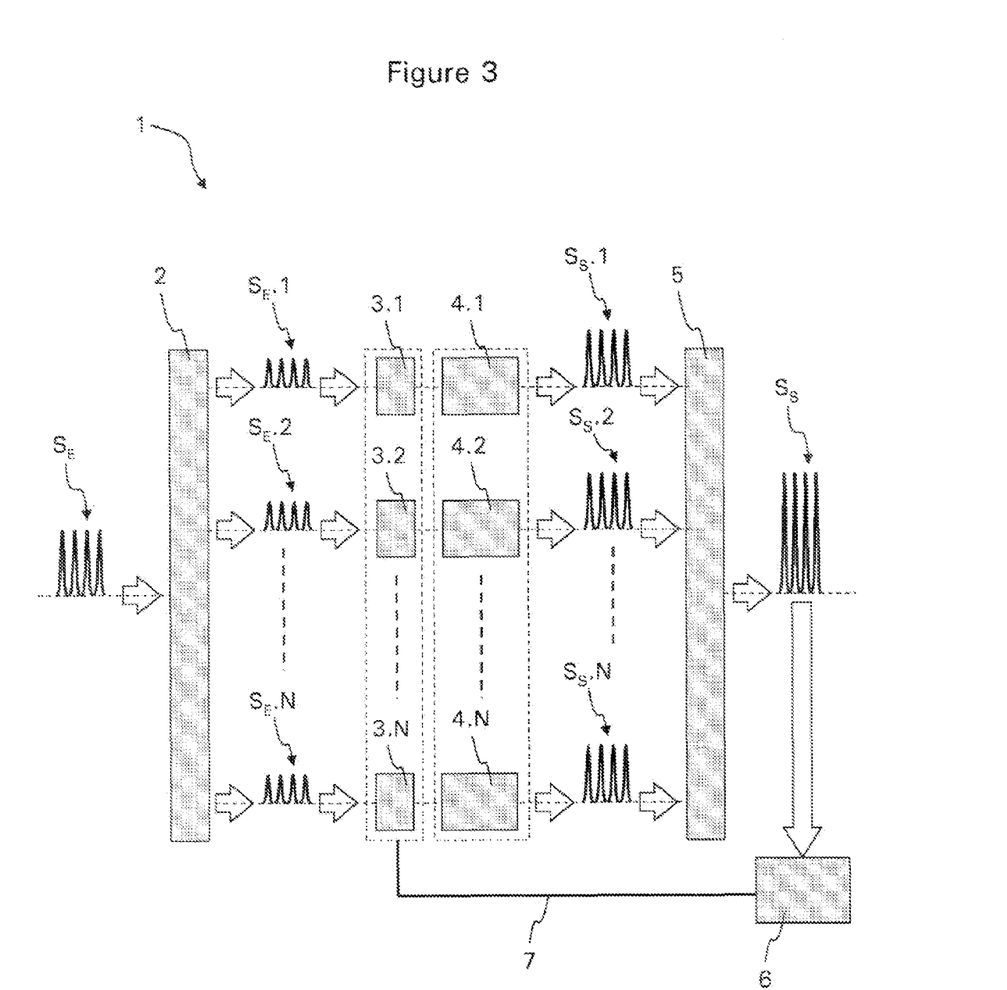
FIG. 3 shows schematically a device for amplifying an optical signal according to the invention.

The amplification device 1, according to the present invention and shown schematically in FIG. 3, makes it possible to achieve this object. To this end, it comprises spatial division means 2, arranged to spatially disperse the optical signal $S_E$ into N elementary optical signals $S_E.1, S_E.2, \ldots, S_E.N$, N being an integer at least equal to 2. These elementary signals have spectral ranges $\Delta\lambda_E.1, \Delta\lambda_E.2, \ldots, \Delta\lambda_E.N$ shown in diagram A in FIG. 4. More precisely, the spatial division means 2 are arranged such that the spectral ranges $\Delta\lambda_E.1, \Delta\lambda_E.2, \ldots, \Delta\lambda_E.N$ are adjacent in pairs and form, substantially by juxtaposition, the spectral range $\Delta\lambda_E$ of the optical signal $S_E$. The spatial division means 2 thus perform demultiplexing of the spectrum of the signal $S_E$, with the aim of separating the spectral range $\Delta\lambda_E$ of the spectrum into N distinct elementary spectral ranges $\Delta\lambda_E.1, \Delta\lambda_E.2, \ldots, \Delta\lambda_E.N$.

These spatial division means 2 comprise at least one element which is dispersive from a spectral point of view. In this regard, they may comprise for example, in a non-limiting manner:

- a diffraction grating 8 (diagram A in FIG. 5);
- a prism 9 (diagram B in FIG. 5);
- a set of dichroic mirrors 10.1, 10.2, ..., 10.N (diagram C in FIG. 5) having cut-off frequencies determined so as to reflect the spectral bands intended for the elementary signals, respectively $S_E.1, S_E.2, \ldots, S_E.N$, these mirrors 10.1 to 10.N being disposed in a cascade in order of increasing cut-off frequency (or decreasing, depending on whether the filters are high-pass or low-pass);
- a set of circulators and Bragg gratings 11.1, 11.2, ..., 11.N (diagram D in FIG. 5) disposed in the same way as the dichroic mirrors in diagram C in FIG. 5; or
- an AWG (Arrayed Waveguide Grating) assembly having an integrated multiplexer-demultiplexer (diagram E in FIG. 5) comprising a first waveguide 12A receiving the signal $S_E$, a first planar guide 12B connected to the guide 12A to separate the elementary spectral ranges and transmit them to waveguides 12C and then, via a second planar guide 12B, to waveguides 12E.

The amplification device 1 in FIG. 3 also comprises elementary amplifiers 4.1, 4.2, ..., 4.N for the N elementary optical signals, respectively $S_E.1, S_E.2, \ldots, S_E.N$. These elementary amplifiers are distributed spatially such that each of them is disposed on the path of the elementary optical signal which it is intended to amplify. They also have elementary amplification gains G.1, G.2, ..., G.N respectively, the spectra of which are adapted to the elementary signals to be amplified. In this context, adapted gain spectrum is understood to mean that the spectral range of the elementary signal to be amplified is substantially included in the spectral range of the corresponding elementary gain, it being possible to regulate the level of gain independently in each of the elementary amplifiers.

Figure 4:
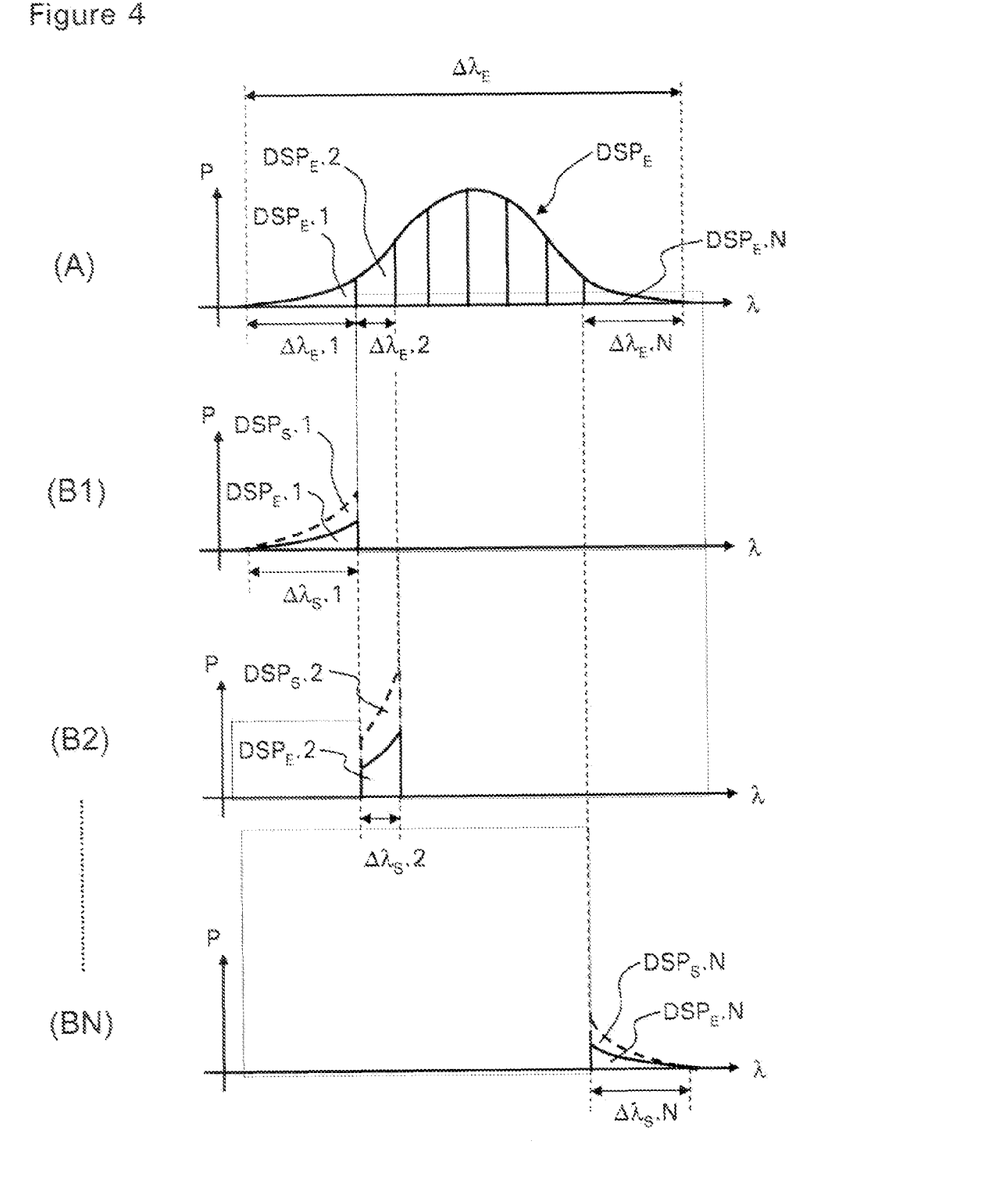
FIG. 4 comprises diagrams 4A, 4B1, 4B2, ..., 4BN showing the spatial division of the optical signal into N elementary signals according to the invention.
Figure 5A:
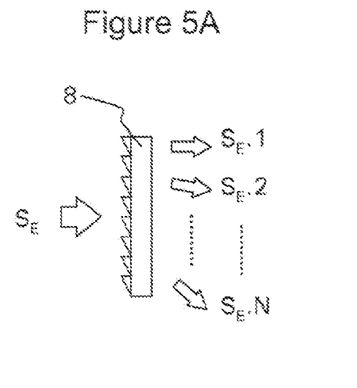
FIGS. 5A, 5B, 5C, 5D and 5E show embodiments of the means for spatial division and/or assembly.
Figure 5B:
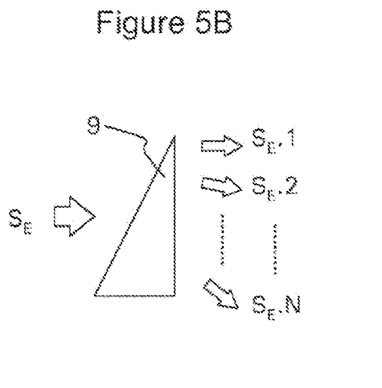
Figure 5C:
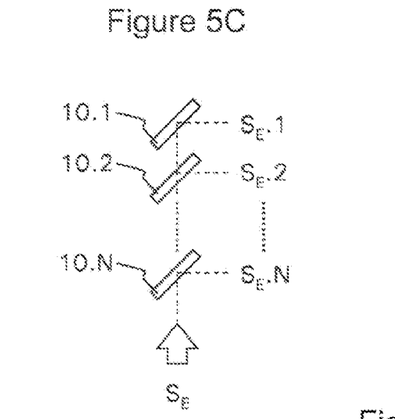
Figure 5D:
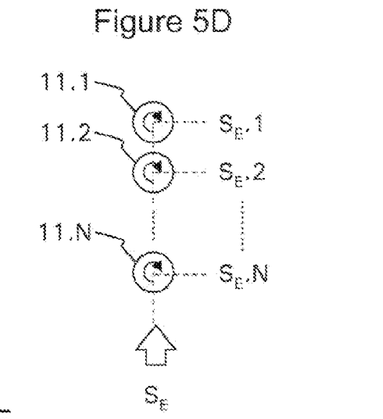
Figure 5E:
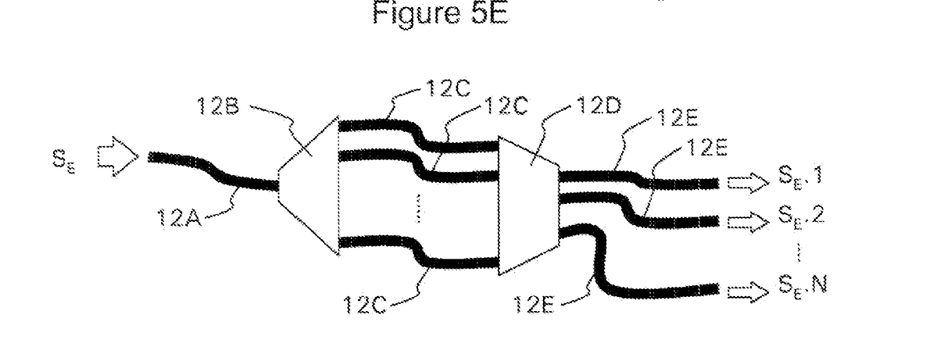

Thus, starting from an initial spectrum $DSP_E$ corresponding to the power spectral density of the initial signal $S_E$ (diagram 1 in FIG. 4), the spatial division means 2 make it possible to divide the spectrum $DSP_E$ into a plurality of elementary spectra $DSP_E.1, DSP_E.2, \ldots, DSP_E.N$, shown respectively in diagrams B1, B2, ..., BN in FIG. 4. In each of these diagrams B1 to BN, the elementary spectra have the same form as the portions of the initial spectrum $DSP_E$, the spectral widths of which are respectively $\Delta\lambda_E.1, \Delta\lambda_E.2, \ldots,$ $\Delta\lambda_E.N$. Each elementary spectrum $DSP_E.1, DSP_E.2, \ldots, DSP_E.N$ also has a spectral width $\Delta\lambda_E.1, \Delta\lambda_E.2, \ldots, \Delta\lambda_E.N$ included in the spectral width $\Delta\lambda_G.1, \Delta\lambda_G.2, \ldots, \Delta\lambda_G.N$ of the spectrum of the corresponding elementary amplifier. Each of the spectra $DSG.1, DSG.2, \ldots, DSG.N$ of the elementary amplifiers 4.1, 4.2, . . . , 4.N may be of the type of that DSG shown in diagram B in FIG. 2, but comprising the spectral range $\Delta\lambda_E.1, \Delta\lambda_E.2, \ldots, \Delta\lambda_E.N$ of the elementary optical signal which it is intended to amplify.

Owing to the elementary amplifiers 4.1, 4.2, . . . , 4.N, the elementary signals $S_E.1, S_E.2, \ldots, S_E.N$ may be amplified uniformly in terms of their spectral ranges $\Delta\lambda_E.1, \Delta\lambda_E.2, \ldots, \Delta\lambda_E.N$. Thus, amplified elementary signals $S_S.1, S_S.2, \ldots, S_S.N$ (shown in FIG. 3), the spectra of which $DSP_S.1, DSP_S.2, \ldots, DSP_S.N$ (shown respectively in diagrams B1, B2, . . . , BN in FIG. 4) have the same width and the same form as the initial elementary spectra $DSP_E.1, DSP_E.2, \ldots, DSP_E.N$, are obtained at the output of the elementary amplifiers.

The elementary amplifiers may be formed for example of N amplifying optical fibres 4.1, 4.2, . . . , 4.N, the cores of which receive the elementary signals $S_E.1, S_E.2, \ldots, S_E.N$. According to another embodiment, the elementary amplifiers may be formed of N cores of a single amplifying optical fibre, or of N cores distributed over a number of amplifying optical fibres between 1 and N, insofar as the elementary signals $S_E.1, S_E.2, \ldots, S_E.N$ are well distributed in these N cores.

The amplification device 1 in FIG. 3 also comprises, downstream of the elementary amplifiers 4.1, 4.2, . . . , 4.N, means 5 for assembling the N amplified elementary optical signals $S_S.1, S_S.2, \ldots, S_S.N$. For this purpose, the means 5 receive all the amplified elementary signals and juxtapose them such that they form at the output of the device 1 an amplified optical signal $S_S$. The assembly means 5 thus perform multiplexing of the N amplified elementary optical signals $S_S.1, S_S.2, \ldots, S_S.N$, with the aim of assembling the amplified elementary spectra $DSP_S.1, DSP_S.2, \ldots, DSP_S.N$ and thus forming an amplified spectrum $DSP_S$.

Figure 6:
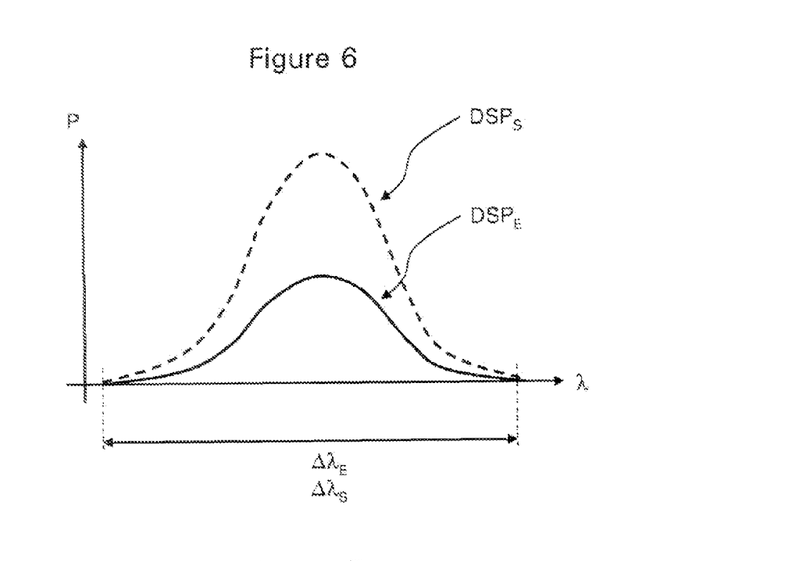
FIG. 6 is a diagram showing the power spectral densities of the optical signal before and after amplification.

Insofar as the amplified elementary spectra $DSP_S.1, DSP_S.2, \ldots, DSP_S.N$ have the same widths and forms as the initial elementary spectra $DSP_E.1, DSP_E.2, \ldots, DSP_E.N$ from which they result, it follows that the spectrum $DSP_S$ of the amplified signal $S_S$ is substantially identical to that $DSP_E$ of the amplified signal $S_E$, as is the case in FIG. 6, in the same way as the spectral range $\Delta\lambda_S$ thereof substantially coincides with the spectral range $\Delta\lambda_E$ of the initial signal $S_E$.

Like the spatial division means 2, the assembly means 5 comprise at least one element which is dispersive from a spectral point of view. In this regard, they may comprise any type of dispersive element which is suited to the spatial division means 2, for example a diffraction grating (diagram A in FIG. 5), a prism (diagram B in FIG. 5), a set of dichroic mirrors (diagram C in FIG. 5), a set of circulators and Bragg gratings (diagram D in FIG. 5), or an AWG-type assembly (diagram E in FIG. 5).

It will be understood that, for an initial ultrashort pulse having a wide spectral width, it may be that no single amplifying medium exists which has a gain spectrum suitable for (that is to say, wider than) that of the pulse, whereas there does exist a set of amplifying media of which the distinct gain spectra overlap and each of which is adapted to that of an elementary pulse having a spectrum which would correspond only to a portion of the initial pulse. The device 1 according to the invention thus makes it possible to amplify the signal $S_E$ without the spectrum $DSP_E$ thereof being degraded and losing information on some of these wavelengths.

In order to obtain an amplified optical signal having a duration substantially equal, or very close, to that of the initial optical signal, the device 1 in FIG. 3 also comprises means for adjusting the spectral phases of the N initial elementary optical signals $S_E.1, S_E.2, \ldots, S_E.N$ and/or amplified elementary optical signals $S_S.1, S_S.2, \ldots, S_S.N$.

These adjustment means comprise firstly a first modulation portion, formed of the elements 3.1, 3.2, . . . , 3.N. These elements are positioned between the spatial division means 2 and the elementary amplifiers 4.1, 4.2, . . . , 4.N in order to modulate, at least in part, the spectral phases of the N elementary optical signals.

It will be understood that the elements 3.1, 3.2, . . . , 3.N of the modulation portion may be positioned anywhere between the division means 2 and the assembly means 5, insofar as the positions thereof allow them to act on the spectral phases of the elementary signals.

These adjustment means also comprise a second control portion 6, positioned downstream of the assembly means 5 in order to receive the amplified optical signal $S_S$, to analyse for example the spectral phase thereof and to deduce therefrom the phase modulations to apply to the N elementary optical signals (in this case initial, as the elements 3.1, 3.2, . . . , 3.N are disposed upstream of the elementary amplifiers) in order for the duration $\Delta t_S$ of the optical signal $S_S$ to be substantially equal to the duration $\Delta t_E$ of said initial optical signal $S_E$. This control portion 6 is also connected to the elements 3.1, 3.2, . . . , 3.N of the modulation portion in order to transmit orders to said elements to adjust the phases of the elementary signals so that said spectral phases reach the values estimated by said control portion 6.

Thus, a feedback loop is implemented which acts in real time on the spectral phases of the N elementary optical signals, introducing adequate delays at the level of the elementary optical signals, in order that these elementary signals may combine temporally in a synchronised manner to form an optical signal $S_S$ of short duration, ideally of a duration substantially equal to that of the initial signal.

In order to adjust the spectral phases of the elementary signals, the elements 3.1, 3.2, . . . , 3.N of the modulation portion may be for example electro-optical modulators, micro-opto-electro-mechanical systems (MOEMS), temperature-controlled fibres (by Peltier effect or in an oven), liquid crystal matrices, piezoelectric mirror micro-positioning systems, or any other type of phase modulator known to a person skilled in the art.

In order to analyse the spectral phase of a signal $S_S$, the control portion 6 may comprise for example, in the case of a signal in the form of ultrashort pulses, a FROG (Frequency-Resolved Optical Grating) auto-correlator, a SPIDER (Spectral Phase Interferometry for Direct Electric-Field Reconstruction) spectral phase interferometer, which are devices which are well known to a person skilled in the art and which also have the advantage of being self-referenced and thus not needing to have the initial signal $S_E$ as a reference.

According to another embodiment which is suitable in particular when the control portion 6 is not self-referenced, said control portion is arranged also to take off a portion of the initial signal $S_E$, such that $S_E$ interferes spectrally with the amplified signal $S_S$, in order to estimate the profile of the spectral phase of said amplified signal and to adjust each elementary signal in order for the combination thereof to be optimal.

Figure 7:
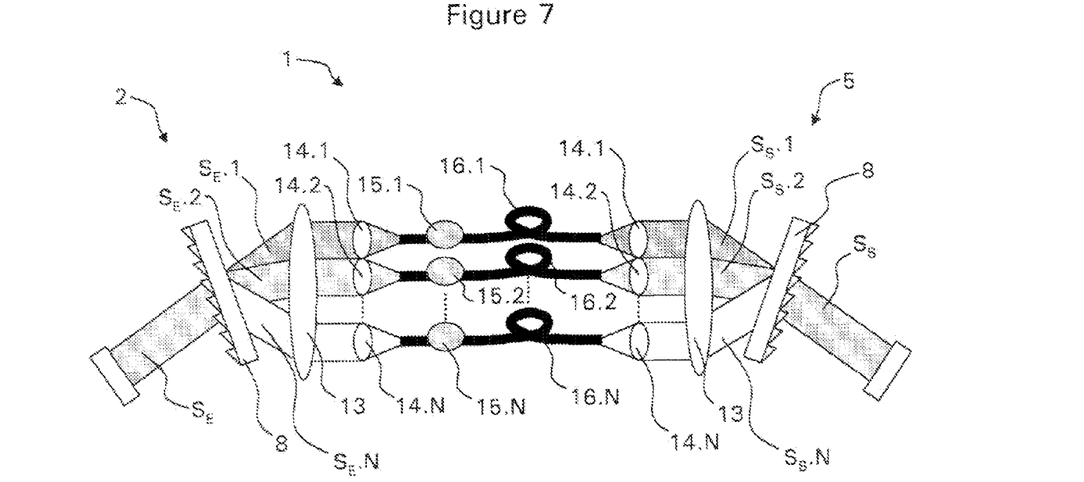
FIG. 7 shows schematically a particular embodiment of the amplification device according to the invention.

An example of an amplification device according to a particular embodiment will now be described with reference to FIG. 7.

In this example, the spatial division means 2 include a diffraction grating 8 which makes it possible to separate spatially the light beam corresponding to the optical signal $S_E$ into N elementary signals $S_E.1, S_E.2, \ldots, S_E.N$. In this example, the elementary amplifiers 4.1, 4.2, ..., 4.N are formed by the amplifying optical fibres 16.1, 16.2, ..., 16.N, the forward portions of which are provided with delay lines 15.1, 15.2, ..., 15.N constituting the elements 3.1, 3.2, ..., 3.N of the portion for modulating the elementary signals. These delays lines are in communication with a control portion described above (not shown in FIG. 7) in order to adjust the phases of the elementary signals and thus promote efficient combination thereof after amplification.

In order to inject the elementary signals $S_E.1, S_E.2, \ldots, S_E.N$ into the optical fibres 16.1, 16.2, ..., 16N, the division means 2 also comprise a collimating lens 13 in order for the beams corresponding to said elementary signals to be parallel beams, and an array of microlenses 14.1, 14.2, ..., 14.N, each of which is associated with an elementary signal and the focus of which is positioned at the input of the corresponding fibre.

In this example, the assembly means 5 are symmetrical with respect to the division means 2, which ensures a reconstruction of the optical signal which is, from a spectral point of view, as close as possible to the initial signal.

The above examples have been described for an application in which an optical signal is amplified while maintaining its duration and its spectrum, in terms of both its width and its form. Thus, only the amplitude of the temporal profile of the signal has been acted on. However, it is self-evident that the present invention may be adapted to provide an amplified optical signal of which the temporal profile (in terms of amplitude and phase) and the spectral profile (in terms of width and form) are controlled such that the signal corresponds substantially to a signal having predetermined features. For this purpose, the invention may in particular act on the level of gain of each elementary amplifier 4.1, 4.2, ..., 4.N as well as on the adjustment means 3.1, 3.2, ..., 3.N, 6, 7.

It will be noted that the invention is suitable in particular for producing high-power pulses of short duration (for example less than one hundred femtoseconds), which pulses make it possible in particular:
- to perform athermic micro-nanostructuring of special, hard, precious or sensitive materials, with the aim for example of improving the speed for performing this structuring while maintaining a very high level of fineness of the engraving;
- to photo-inscribe guides incorporated into volumes;
- to generate high-order harmonics, which promotes the use of femtosecond laser to implement coherent XUV sources adapted to high-contrast imaging with high spatial resolution; or
- to generate X-rays for medical imaging applications with high spatial resolution (for example mammography) or proton beams for proton therapy applications.

The invention claimed is:

1. Method for amplifying an optical signal ($S_E$), wherein:
   the optical signal ($S_E$) is spatially divided into N elementary optical signals ($S_E.1, S_E.2, \ldots, S_E.N$), the spectral ranges ($\Delta\lambda_E.1, \Delta\lambda_E.2, \ldots, \Delta\lambda_E.N$) of which are adjacent in pairs and form, substantially by juxtaposition, the spectral range ($\Delta\lambda_E$) of the optical signal ($S_E$), N being an integer at least equal to 2;
   the N elementary optical signals ($S_E.1, S_E.2, \ldots, S_E.N$) are amplified respectively by N elementary amplifiers (4.1, 4.2, ..., 4.N), the spectral ranges of amplification ($\Delta\lambda_G.1, \Delta\lambda_G.2, \ldots, \Delta\lambda_G.N$) of which respectively comprise substantially the spectral ranges ($\Delta\lambda_E.1, \Delta\lambda_E.2, \ldots, \Delta\lambda_E.N$) of said N elementary optical signals;
   the N amplified elementary optical signals ($S_S.1, S_S.2, \ldots, S_S.N$) are assembled to form an amplified optical signal ($S_S$), the spectral range ($\Delta\lambda_S$) of which substantially coincides with a predetermined spectral range; and
   the spectral phases of the N initial elementary optical signals ($S_E.1, S_E.2, \ldots, S_E.N$) are adjusted before amplification on the basis of the spectral phase of said amplified optical signal ($S_S$).

2. Method according to claim 1, wherein the N elementary optical signals ($S_E.1, S_E.2, \ldots, S_E.N$) are amplified by the N elementary amplifiers (4.1, 4.2, ..., 4.N) such that the power spectral density ($DSP_S$) of the amplified optical signal ($S_S$) has a profile substantially identical to a predetermined profile.

3. Method according to claim 1, wherein the spectral phases of the N elementary optical signals ($S_E.1, S_E.2, \ldots, S_E.N$) are adjusted, on the basis of the spectral phase of said amplified optical signal ($S_S$), such that the duration ($\Delta t_S$) of the amplified optical signal ($S_S$) is substantially equal to a predetermined duration.

4. Device (1) for amplifying an optical signal ($S_E$), comprising:
   means (2) for spatially dividing the optical signal ($S_E$) into N elementary optical signals ($S_E.1, S_E.2, \ldots, S_E.N$), the spectral ranges ($\Delta\lambda_E.1, \Delta\lambda_E.2, \ldots, \Delta\lambda_E.N$) of which are adjacent in pairs and form, substantially by juxtaposition, the spectral range ($\Delta\lambda_E$) of the optical signal ($S_E$), N being an integer at least equal to 2;
   elementary amplifiers (4.1, 4.2, ..., 4.N) arranged to amplify the N elementary optical signals, the spectral ranges ($\Delta\lambda_G.1, \Delta\lambda_G.2, \ldots, \Delta\lambda_G.N$) of said elementary amplifiers respectively comprising substantially the spectral ranges ($\Delta\lambda_E.1, \Delta\lambda_E.2, \ldots, \Delta\lambda_E.N$) of said N elementary optical signals;
   means (5) for assembling the N amplified elementary optical signals ($S_S.1, S_S.2, \ldots, S_S.N$) to form an amplified optical signal ($S_S$), the spectral range ($\Delta\lambda_S$) of which substantially coincides with a predetermined spectral range; and
   means (3.1, 3.2, ..., 3.N, 6, 7) for adjusting the spectral phases of the N initial elementary optical signals ($S_E.1, S_E.2, \ldots, S_E.N$) before amplification on the basis of the spectral phase of said amplified optical signal ($S_S$).

5. Device according to claim 4, wherein the elementary amplifiers (4.1, 4.2, ..., 4.N) comprise an array of N cores (4.1, 4.2, ..., 4.N) of at least one amplifying optical fibre, having respectively N elementary amplification gains ($G.1, G.2, \ldots, G.N$), the means (2) for spatially dividing the optical signal ($S_E$) being arranged to distribute the N elementary optical signals ($S_E.1, S_E.2, \ldots, S_E.N$) spatially into said N cores.

6. Device according to claim 4, wherein the adjustment means (3.1, 3.2, ..., 3.N, 6, 7) comprise:
   a first modulation portion (3.1, 3.2, ..., 3.N), positioned between the means (2) for spatially dividing the optical signal ($S_E$) and the means (5) for assembling the N amplified elementary optical signals ($S_S.1, S_S.2, \ldots, S_S.N$), capable of modulating at least in part the spectral phases of the N initial elementary optical signals ($S_E.1, S_E.2, \ldots, S_E.N$); and
   a second control portion (6), disposed downstream of said means (5) for assembling said amplified elementary optical signals ($S_S.1, S_S.2, \ldots, S_S.N$), connected to the first modulation portion (3.1, 3.2, ..., 3.N) and capable of receiving the amplified optical signal ($S_S$), of analysing the spectral phase of said amplified optical signal ($S_S$), of deducing therefrom the phase modulations to apply to said N elementary optical signals in order for the power spectral density ($DSP_S$) of the amplified optical signal ($S_S$) to have a profile substantially identical to a predetermined profile, and of providing corresponding orders to said first modulation portion.

7. Device according to claim 6, wherein the second control portion (6) of the adjustment means (3.1, 3.2, ..., 3.N, 6, 7) is arranged to receive the initial optical signal ($S_E$) and compare it, during the analysis of the spectral phase of the amplified optical signal ($S_S$), with said amplified optical signal ($S_S$).

8. Device according to claim 4, wherein the means (5) for assembling the N amplified elementary optical signals ($S_S.1, S_S.2, ..., S_S.N$) are arranged to cause said N amplified elementary optical signals to interfere temporally.

9. Device according to claim 4, wherein the number N of elementary optical signals ($S_E.1, S_E.2, ..., S_E.N$) and the spectral phases ($\Delta\lambda_E.1, \Delta\lambda_E.2, ..., \Delta\lambda_E.N$) of said elementary optical signals are determined such that the spectral phases ($\Delta\lambda_G.1, \Delta\lambda_G.2, ..., \Delta\lambda_G.N$) of the N elementary amplifiers (4.1, 4.2, ..., 4.N) respectively comprise substantially the spectral phases of said N elementary optical signals.

10. Device according to claim 9, wherein the number N of elementary optical signals ($S_E.1, S_E.2, ..., S_E.N$) and the spectral ranges ($\Delta\lambda_E.1, \Delta\lambda_E.2, ..., \Delta\lambda_E.N$) of said elementary optical signals are also determined such that the energies of said N elementary optical signals are substantially equal.

11. Device according to claim 4, wherein at least two of the N elementary amplifiers (4.1, 4.2, ..., 4.N) have different elementary amplification gains (G.1, G.2, ..., G.N).

12. Method according to claim 1, wherein the optical signal ($S_E$) is a pulse with a duration of less than one hundred femtoseconds.

13. Method according to claim 1, wherein the spectral range ($\Delta\lambda_E$) of the optical signal ($S_E$) comprises x-rays, extreme ultraviolet radiation, or both.

* * * * *